Jan. 28, 1964  E. F. W. ALEXANDERSON  3,119,957
ELECTRIC MOTOR CONTROL SYSTEM
Filed June 16, 1961  4 Sheets-Sheet 1

INVENTOR
ERNST F. W. ALEXANDERSON

INVENTOR
ERNST F.W. ALEXANDERSON

Jan. 28, 1964  E. F. W. ALEXANDERSON  3,119,957
ELECTRIC MOTOR CONTROL SYSTEM
Filed June 16, 1961  4 Sheets-Sheet 4

INVENTOR
ERNST F.W. ALEXANDERSON

United States Patent Office 3,119,957
Patented Jan. 28, 1964

3,119,957
ELECTRIC MOTOR CONTROL SYSTEM
Ernst F. W. Alexanderson, 1132 Adams Road,
Schenectady, N.Y.
Filed June 16, 1961, Ser. No. 117,538
8 Claims. (Cl. 318—257)

My invention relates to an "Electric Motor Control System" and more particularly to a system for reproducing position such as those described in my Patent No. 2,550,514, filed May 19, 1932, and issued April 24, 1951, and the system described in my patent application Serial No. 103,618, filed April 17, 1961, now abandoned.

Both of these systems comprise a direct current motor with unidirectional field excitation and a reversible rectified voltage applied to the armature. Both systems meet the requirement that there should be a smoothly controllable transition from motoring torque to braking torque at any speed.

One object of this invention is to provide means for meeting the same requirements of a controllable transition from motoring torque to braking torque by a unidirectional rectified voltage applied to the motor armature and a reversible control of the motor field.

This may offhand not seem like a substantial objective. It is, however, important for the following reasons: My patent filed in 1932 specifies rectification by vacuum tubes of the thyratron type. While this system was successfully used on war ships, it was on my own initiative and invention, superseded by the Amplidyne System of Control, which was used extensively during World War II. Recent developments have, however, brought forth semiconductor triodes of the thyratron type which are more desirable than vacuum tubes for such installations. It is conceivable that the system described in my early patent could be reproduced with semiconductor triodes, but these seimconductors have some limitations which do not apply to vacuum tubes. Reversible rectification imposes twice as high voltage strain on the triodes as unidirectional rectification. Reversible rectification also requires duplication of the rectifier equipment, one rectifier for forward and another for reverse operation. Thus one pair of triodes can be operated at twice the output voltage and therefore twice as high power as two pairs of triodes reversible rectification. In other words each triode is four times as useful.

The system described in my patent application Serial No 103,618, filed April 17, 1961, comprises reversible armature control with two diodes, but for reasons given above is adapted to use with small motors.

It may therefore be stated that an object of the invention is to provide a system for reproducing position using semiconductor triodes which is adaptable to large motors. The use of unidirectional rectification and reversible field control is a means to this end.

The use of reversible field control introduces new problems and an object of the invention is to provide practical solutions to these problems. One requirement, as stated above, is that there should be a smooth controllable transition from motor torque to braking torque at any speed. A solution to this requirement is described in my patent application "Electric Motor Control Apparatus," Serial No. 103,620, filed April 17, 1961, now Patent No. 3,050,-672 issued August 21, 1962.

The method of operation, as described in this patent application, is, however, not applicable to positioning control. A further refinement of the control is required. To be so applicable the system must respond to a simple A.C. signal such as is generated by a selsyn. The amplitude of the signal is a measure of the torque that is desired and the reversible phase of the signal calls for reversal of the torque. It should be noted that the signal always passes through zero during reversal. Thus it can be seen that the control must respond to such a signal in two separate and entirely different ways. The armature current must respond to the amplitude of the signal regardless of its phase because the armature current is unidirectional. The field control on the other hand should determine the polarity of the field when the signal passes through zero and the reversal should be completed at a signal amplitude so low that the motor torque is zero of practically zero. Any further variation of the signal amplitude should have no effect on the field control.

How this dual response to the control singal is accomplished shall be described in detail. It should be noted, however, that the control which was developed to meet the requirements of positioning control has merits of its own, particularly when a remote control is desired. It may therefore be stated that one object of the invention is to provide an improved system of reversible speed torque and braking control.

Figure 1:
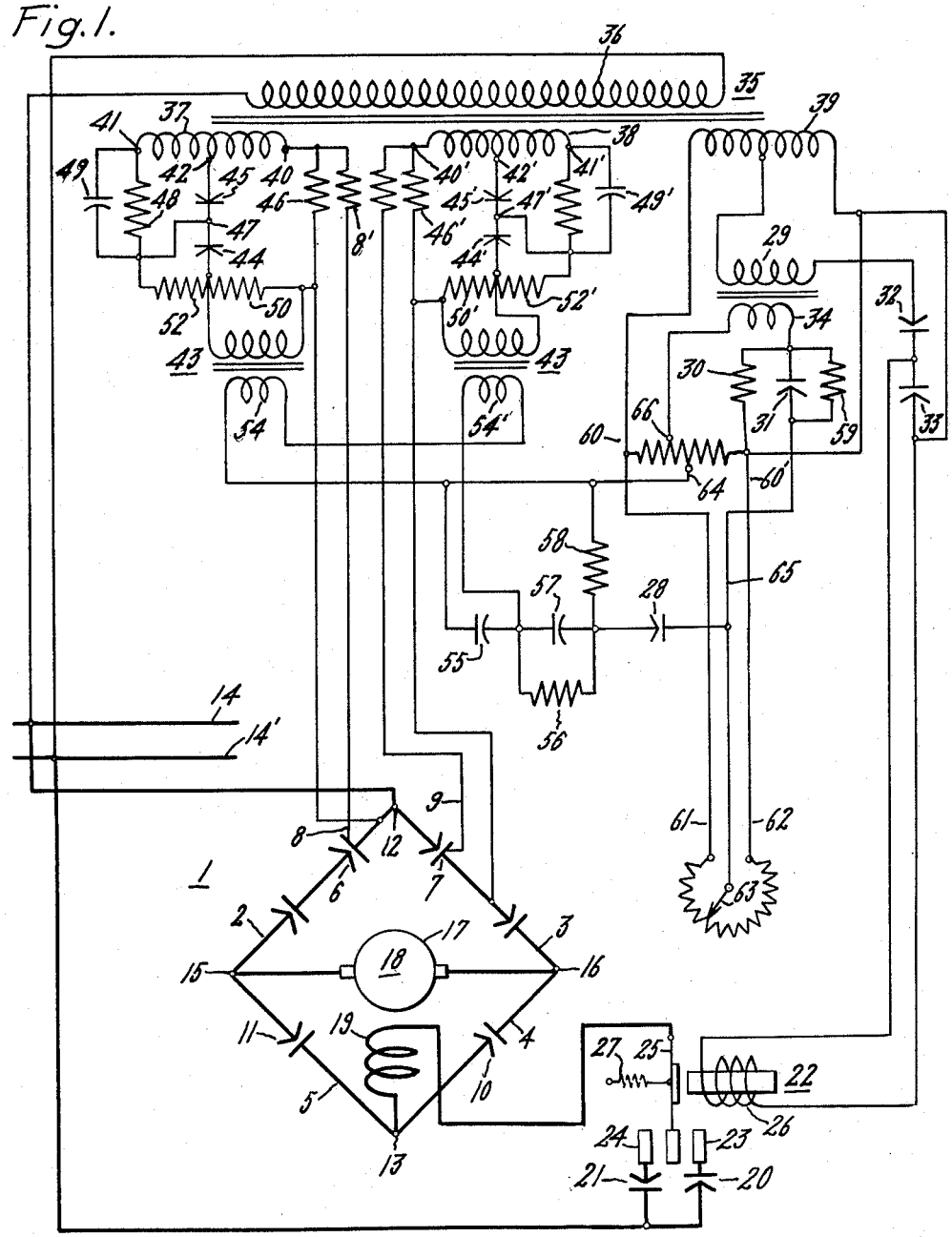
FIG. 1 is a diagrammatic illustration of one embodiment of my invention as applied to a direct current motor control system with means for operating the motor with reversible speed torque and braking control.

Referring more particularly to FIG. 1, I have shown a single phase power network 1 in the form of a four branch bridge arrangement comprising branches 2, 3, 4 and 5. A semiconductor triode 6 is connected in arm 2 and a similar triode is connected in arm 3. One suitable semiconductor triode is presently offered to the trade by the General Electric Company and is identified as a silicon controlled rectifier. The triodes 6 and 7 are provided respectively with control electrode circuits 8 and 9. Diodes 10 and 11 are connected in branches 4 and 5 respectively. Branches 2 and 3 are connected together to form a junction terminal 12 and branches 4 and 5 are connected together to form a junction terminal 13. The conjugate terminals 12 and 13 constitute alternating current input terminals to which a source of alternating current indicated by a pair of conductors 14 and 14' is connected. The remaining terminals of the bridge are conjugate terminals 15 and 16 and constitute direct current output terminals across which the armature 17 of a direct current motor 18 is connected. The field winding 19 of the motor 18 is connected between the junction terminal 13 and the lower alternating current terminal 14 (as viewed in the drawing). The respective triodes 6 and 7 and diodes 10 and 11 are arranged for full wave rectification and are so poled as to produce a unidirectional current from junction terminal 16 to junction terminal 15.

In each of the branches 2 and 3 and in series relation with the triodes 6 and 7 is included respectively a diode. These diodes are not necessary for operation but have the object of increasing the reliability by protecting the triodes from arcbacks. The function of these diodes is described in my patent application "Electric Control Circuits," Serial No. 103,619, filed April 17, 1961.

While the field winding is connected in the alternating current input circuit it is arranged to be traversed by halfwaves of current of the same polarity of the alternating current circuit for one direction of rotation of the motor and by halfwaves of the opposite for motor operation in the reverse direction of rotation. The current in the field winding is continuous and of substantially constant amplitude because of the relatively high reactance of the field winding. To provide a reversible field excitation which is interconnected with the reactor-diode control and firing circuits of the triodes I provide a pair of diodes 20 and 21 which are selectively connected between the terminals of the field winding 19 through a relay 22 having contacts 23 and 24 and a contact arm 25. The contact arm is provided with an operating coil 26 to move contact arm 25 to close contact 24 upon energization of its operating coil and a suitable biasing means such as a spring 27 to move and hold contact 23 closed when operating coil 26 is deenergized. If it is assumed that the input current junction 12 is in the positive half cycle of the alternating voltage applied, the current direction through the field winding would be traveling up through the field and out to the lower conductor 14. When the lower conductor is on the negative half cycle of the input voltage of the field winding 19 is by-passed by the closed contact 23 and the diode 20. This direction of field excitation may be designated as "forward" operation of the motor. If the relay is operated to close contacts 24 the field is energized by the negative halfwaves of the alternating voltage supply and the positive halfwaves are by-passed by contacts 24. This direction of energization may be designated as "reverse" operation of the motor.

The reactor-diode firing circuit utilized in the present invention is in principle and general circuitry as the embodiments described and claimed in my copending application Serial No. 103,619, filed April 17, 1961, and entitled "Electric Control Circuits." The firing circuits per se as a means for controlling triodes with a control electrode as utilized in a general direct current utilization circuit are claimed in the copending application just identified. While I have selected for purpose of illustration only one embodiment of several species reactor-diode firing control circuits described and claimed in the copending application just referred to for disclosing reversible speed torque and braking system of motor control it will be understood by those skilled in the art that any one of the several firing control circuits of the aforementioned copending application may be utilized in the present system without departing from my invention in its broader aspect. The adaptation and coordination of such firing circuits in a motor control system is the subject matter to which the present invention is directed. Accordingly, attention will be directed to the details of circuitry and control of electrical quantities of the control and motor circuits pertaining to the present motor control system.

In FIG. 1 of the drawings I have diagrammatically illustrated one form of my reactor-diode control circuitry for controlling the excitation of semiconductor triodes in the electric network bridge 1. The control apparatus comprises a source of alternating voltage derived from input conductors 14 of the motor network as represented by transformer 35 having a primary winding 36 and the secondary windings 37, 38 and 39. The secondary winding 39 is a source of power for certain control windings and it will be evident that it need not be a winding on the main control transformer so long as the voltage is derived from the alternating current circuit in proper phase relation. The two principal secondary windings 37 and 38 are poled so that firing pulses are delivered from the respective secondary windings in alternate half cycles of the voltage applied to the motor network.

The secondary winding 37 is provided with a "base" terminal 40 (so-called for purpose of identification), a "high" voltage tap 41 and an intermediate or "lower" voltage tap 42. The reactor-diode group for generating the make-alive or firing pulse (for example on the positive half cycle) comprises a saturable reactor 43 having a sharp saturation characteristic and (in series therewith) a first diode 44. A second diode 45 with its polarity reversed relative to the first diode 44 connects the reactor-diode group to the "lower" transformer tap 42 and the opposite end of the reactor is connected through a low value load impedance element 46 to the "base" terminal 40. The firing circuit 8 of the triode 6 is connected to be energized from load impedance 46 through a current limiting resistance 8'. A junction terminal 47 is established between diodes 44 and 45 and the junction terminal is connected to the higher voltage tap 41 through a resistance element 48. The resistance element 48 may be shunted by capacitor 49 to accentuate the firing peak but depending on the degree of sharpness of the saturation characteristic of the reactor 43, it may be found that capacitor 49 is not needed. A resistance element 50 is connected between the two terminals of reactor 43. A resistance element 52 is connected in shunt relation to diode 44 to establish a negative bias. The relative value of resistance elements 50 and 52 is so adjusted that the firing is suppressed when the motor is in a standby operating condition.

A second reactor-diode group similar in all respects to the above described reactor-diode group (except for being arranged for operation on the half cycles of applied voltage reversed with respect to that described) is associated with secondary winding 38 and corresponding elements and reference points have been assigned like primed numerals for convenience of identification.

The control elements of the reactor-diode groups in addition to those just described are constituted by control windings inductively associated with the reactors 43 and 43'. A pair of control windings 54 and 54' are connected in series relation and inductively associated with reactors 43 and 43' respectively and connected to receive a unidirectional positive control current. Such a control current advances the timing of the firing of triodes 6 and 7 and thereby controls the rectified current and voltage supplied to the armature circuit of the motor.

The signal to which this control system should respond is an alternating current which may be transmitted from a point of remote control. This signal has two separate and entirely different functions. One function is to control the timing of firing the triodes 6 and 7 thereby controlling the rectified current and voltage in the armature circuit. The signal is rectified before being applied to the series connected control windings 54 and 54'. The control therefore responds to the amplitude of the signal regardless of its reversible phase. The second function it to determine the polarity of the motor field in response to the phase reversal of the signal. For this purpose the signal acts upon the control winding of a reactor-diode circuit which energizes or deenergizes the activating winding 26 of the relay described above which determines the polarity of the field. Said reactor 29 and diode 32 are energized from the secondary transformer winding 39 which serves as power supply for the control circuits. The activating winding 26 of the relay is shunted by a diode 33 which provides a path for the continuous current in the winding 26 during the intervals between the energizing pulses delivered through diode 32. The control winding 34 of the reactor 29 acting as a magnetic amplifier is biased by an alternating current passed through resistance 30 so that the saturating pulses are retarded until the end of the half cycle and barely strong enough to activate the relay 22 when no signal is received. A diode 31 admits only the positive half cycles of the signal which pass through control winding 34 which is so poled that it has no effect on the functioning of the reactor-diode group when the positive half cycle of the signal coincides with the positive half cycle of the power supply. When, however, the phase of the signal is reversed calling for reversed motor torque, the signal which is passed by the diode 31 adds to the effect of the biasing current passing through resistance 30. This biasing current is sufficient to nearly suppress the saturating pulse and therefore an added signal of less than 10% of full strength is sufficient to completely suppress the saturating pulse and thereby deactivate the relay. The result is that the bypassing circuit for the field winding is transferred from diode 20 to diode 21 and the field connections are set for reverse torque. This change in connections is completed by a signal strength of less than 10% of full signal.

The combined effect of armature and field control can thus be briefly described as follows: When no signal is received, the rectification is suppressed and the motor is in its standby condition. When a 10% signal strength has been reached the polarity of the field has already been determined in accordance with the reversible phase of the signal but at that signal level the rectification is neatly suppressed so that the motor delivers practically no torque. Further increase of signal strength brings the motor up to full torque and full speed in the direction indicated by the phase of the signal.

The two separate and different effects of the signal upon the armature and field circuits can be executed in several ways. FIG. 1 shows a preferred arrangement. The signal is split by a pair of diodes 28 and 31 so that the positive half waves are used for field control and the negative half waves for armature control. In the branch of the signal which controls the armature the control windings 54 and 54' which determine the timing of firing the triodes are connected in series. The group of series connected windings are shunted by an electrolytic capacitor 55 which is charged by the half waves of the signal and discharged through the windings as a practically constant current. It is desirable to make this control responsive not only to the amplitude of the signal but also to the rate of change of amplitude. The half wave signal is therefore passed through a resistance 56 shunted by an electrolytic capacitor 57. The rate of change effect is further emphasized by another resistance 58 which bypasses the control winding and capacitor 57.

The field control utilizes the positive half waves of the signal, the negative half waves being suppressed by diode 31. This diode is, however, shunted by resistance 59 which admits a small fraction of the negative half wave of the signal. This is a corrective compensation for a minor secondary effect. The half wave of the signal admitted by the diode should have no effect on the saturation pulse of the reactor when the half wave of the signal coincides with the positive half cycle of the power supply. Actually a strong signal has the tendency to weaken the saturation pulse of current. This tendency is neutralized or even reversed by a relatively weak compensating signal on the negative half cycle of the power supply.

In the embodiment of my invention illustrated in FIG. 1 the signal is generated by a Wheatstone bridge. It should be understood, however, that the armature and field control described above will respond to a suitable alternating current signal generated in any other way. In a pure positioning control, for example, the signal is generated by a selsyn system. The control described with its dual function will respond to such a signal transmitted by a pair of wires.

With further reference to FIG. 1 the signal is generated by a Wheatstone bridge which has two fixed arms 60 and 60' included in the control assembly and two arms 61 and 62 adjustable by a sliding contact 63 located at a point of remote control. The signal voltage appears between the sliding contact and the junction 64 of the fixed arms. The signal is transmitted by the middle wire of the remote control 65. The positive half waves of the alternating current passing through this control wire is split into two branches as described above so that the positive half waves control the field and the negative half waves control the armature. The signal current which controls the field passes through a control winding 34 to which a permanent bias current is applied passing through resistance 30. This bias current generates a bias voltage which is thus introduced in the signal circuit. The bias voltage is, however, neutralized with reference to the signal circuit by including an equal compensating voltage. This is accomplished by not returning that branch of the signal circuit to the neutral of the Wheatstone bridge 64 but to an offset point 66 which has a voltage difference to the neutral 64 which represents the desired compensating voltage.

Figure 2:
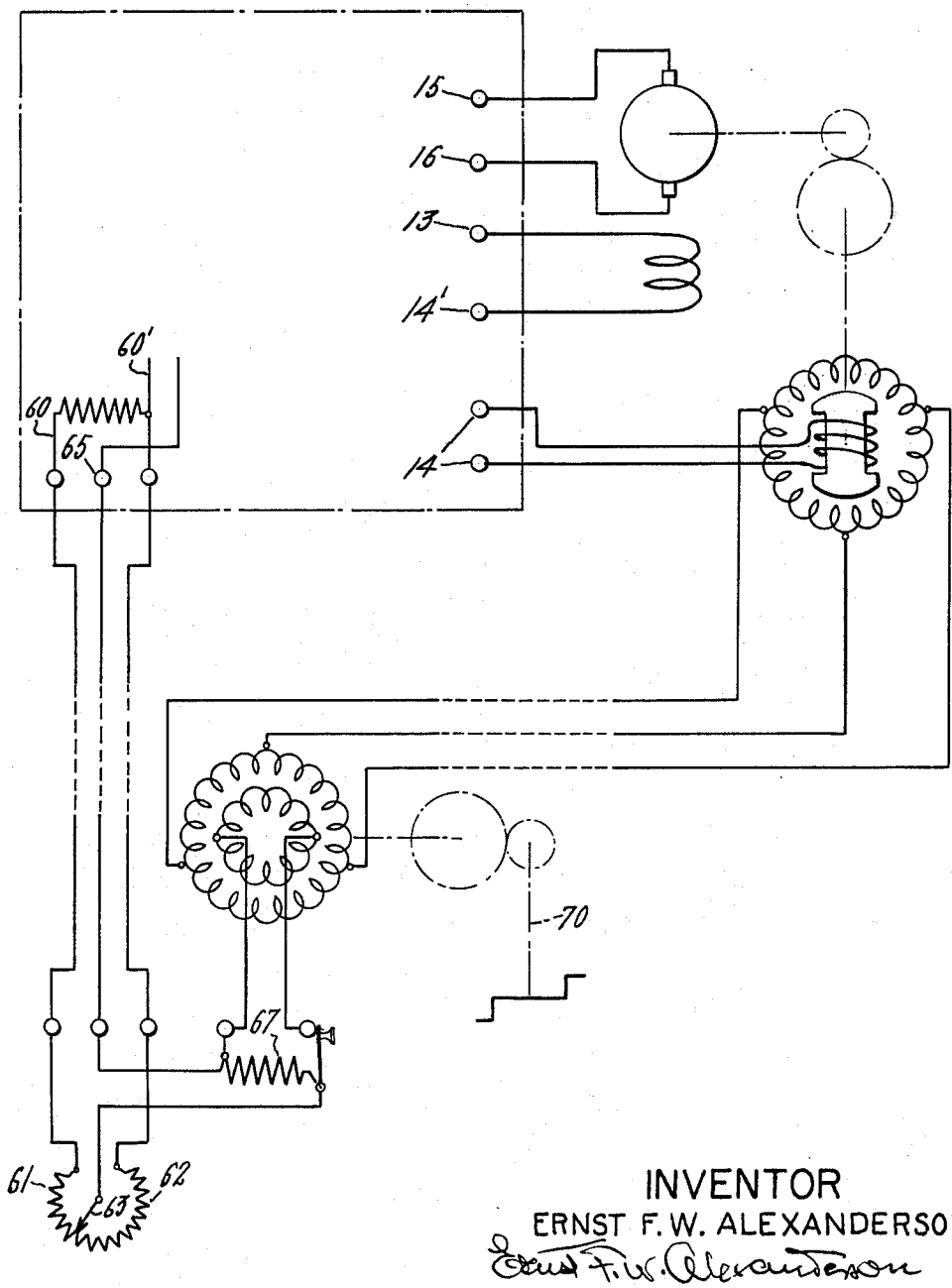
FIG. 2 is a modification of the embodiment of FIG. 1 adapted to reproducing position and providing dual control.

FIG. 2 is a modification of the embodiment of FIG. 1. It shows a symbol of the control assembly of FIG. 1 indicating the terminals of the motor armature 15 and 16, the terminals of the motor field 13 and 14, the terminals of the power supply 14 and 14', the terminal of the conductor 65 which carries the remote control signal current, and the terminals of the fixed Wheatstone bridge arms 60 and 60'. These numerals are the same as in FIG. 1. The terminals of the variable Wheatstone bridge arms 61 and 62 are connected by a pair of wires to the fixed bridge arms 60 and 60' in the control assembly. Between the sliding contact 63 and the terminal of the conductor 65 which carries the signal current is introduced a resistance 67. To the terminals of this resistance is applied a signal generated by a selsyln system adapted to a positioning control. This signal can thus be superimposed on the signal generated by the Wheatstone bridge thus providing a dual control. This dual control can be operated in three ways. First: The receiving selsyn 68 at the remote control point can be left running idle in synchronism with the transmitting selsyn 69 geared to the load thus serving as a visual indicator of the position of the load while the torque and speed of the motor is being controlled by the sliding contact 63 of the Wheatstone bridge.

Second: The sliding contact 63 may be left on its neutral while the receiving selsyn is manipulated by the position determining shaft 70 as a pure positioning control.

Third: The motor is brought up to a speed slightly higher than that desired by manipulation of the sliding contact 63 (for instance in tracking a target) but is then restrained to hold the correct moving position by applying a slight frictional torque to the remote control selsyn.

Figure 3:
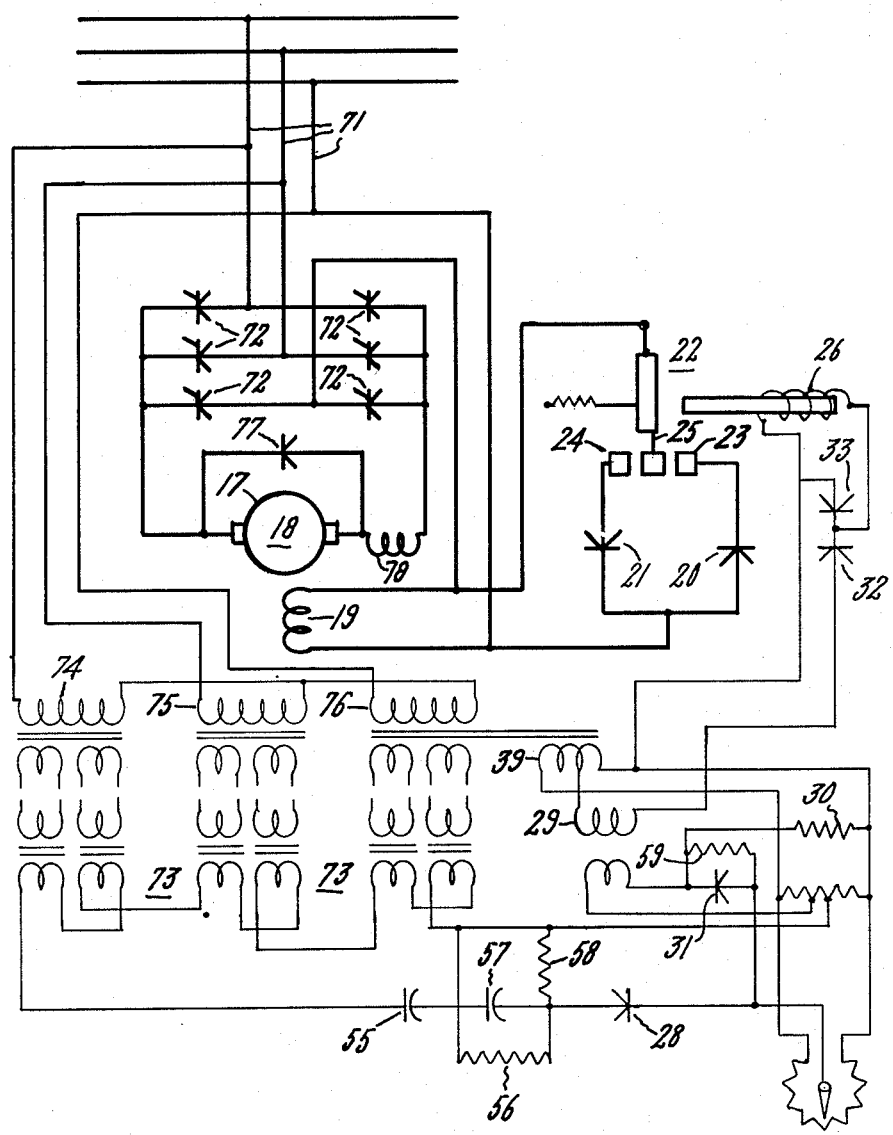
FIG. 3 is a further modification of the embodiment of FIG. 1 adapted for a three phase input system.

FIG. 3 is a further modification of the embodiment of FIG. 1 adapted for a three phase power input system. The motor field 19 is energized by the current flowing in one of the three phase power conductors 71. The system of field energization and reversal of polarity is the same as that illustrated in FIG. 1. A pair of diodes 20 and 21 are connected in shunt relation to the terminals of the field winding 19 through a relay 22 which alternatively completes the connection of one diode while it interrupts the connection of the other diode. The alternative circuits pass through relay contacts 23 and 24. The relay is activated by magnet winding 26 which is energized from the secondary winding 39 of one of the control transformers. The activating pulse passes through the saturable reactor winding 29 and the diode 32. Diode 33 maintains a continuous path for the current in the relay magnet winding 26 during the intervals between the activating pulses. The activating current pulses passing through saturable reactor winding 29 are controlled by the positive half waves of the signal current. The control winding 29 is biased by the current flowing through resistance 30 so that the current pulse is barely sufficient to activate the relay when no signal is received. When, however, the positive half wave of the signal coincides with the negative half cycle of the power supply the signal suppresses the saturating pulse and the relay is deactivated, thereby reversing the polarity of the field. When on the other hand the positive half wave of the signal coincides with the positive half cycle of the power supply it has no effect and the field connection remains set for forward torque.

The rectification circuit for the armature with six triodes 72 is known as the Gratz circuit. Hence there are three pairs of firing circuits. Each pair of firing circuits is the same as that shown in FIG. 1 and are therefore not described in detail. Each of these three pairs of firing circuits is energized from a control transformer (74, 75 and 76) fed from the same phase as the corresponding triodes. The control windings 73 of the three pairs of firing circuits are, however, all connected in series. This is permissible because the control signal is rectified and functions independently of the phase of the signal.

The control signal is generated by the sliding arm of a Wheatstone bridge as in FIG. 1 but it should be understood that the control system will respond to an alternating current signal generated in any other way such as by a selsyn system.

The negative half waves of the signal pass through diode 28 and are converted into a continuous control current passing through the group of six series connected control windings 73. This control responsive to amplitude and rate of change of amplitude is effected by the combination of capacitors 55 and 57 with resistances 56 and 58 as described in connection with FIG. 1.

The diode 77 connected in shunt relation to the armature has the object of providing a second path for the armature current so that the armature current and field current can be controlled independently. The corresponding function is provided in the embodiment of FIG. 1 by the diodes 10 and 11 which form the lower arms of the rectifying bridge circuit. The diode 77 is not a part of the conventional Gratz circuit and might interfere with the proper commutation from phase to phase because it bypasses the reactance of the armature winding. A reactor 78 is therefore introduced in series relation with the armature circuit outside the bypassing diode 77.

Figure 4:
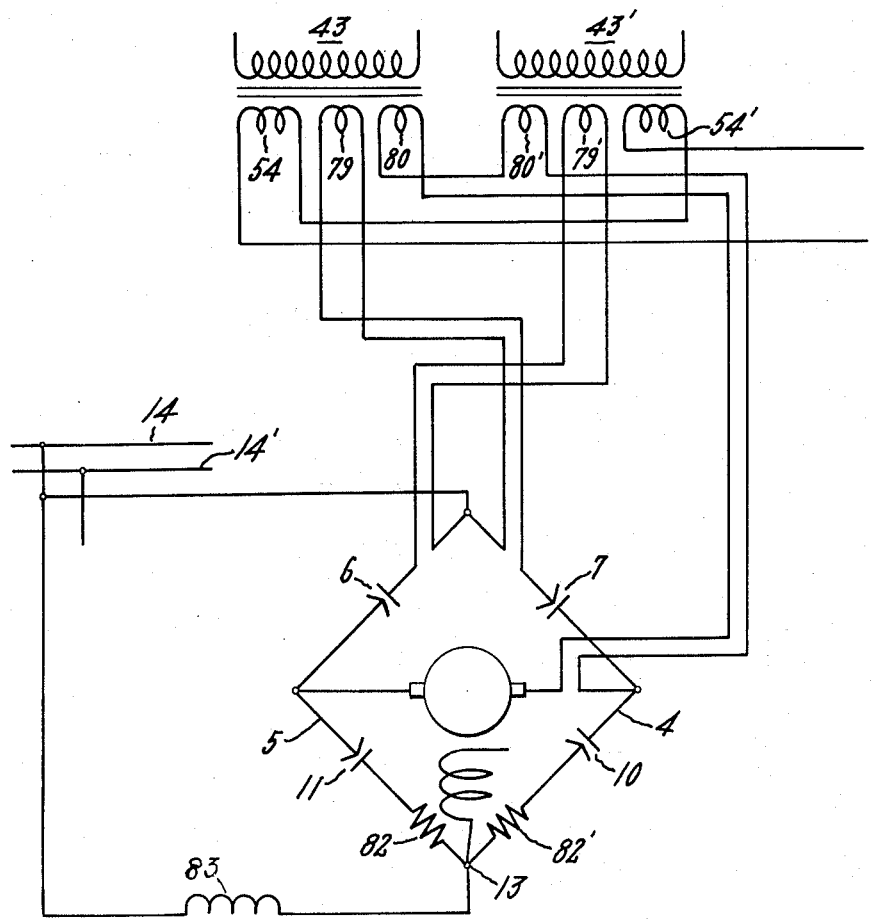
FIG. 4 is a still further modification of the embodiment of FIG. 1 adapted to extensive braking operation.

A still further modification of the embodiment of FIG. 1 is shown in FIG. 4. This modification applies a principle described in my Patent 3,050,672 issued August 21, 1962, Electric Motor Control Apparatus, but it applies this principle in a novel way. The system of control illustrated in FIG. 4 responds to a remote control signal in the same way as in FIG. 1. In addition to the remote control signal a signal responsive to the power current is applied. This current feedback has the object of increasing the rectified voltage automatically when load is applied to the motor. For reasons explained in the said patent this current feedback should be relatively small at standstill and low speed, whereas it should increase with increasing motor speed. The novel way by which this is accomplished may be described as follows: A positive current feedback responsive to the alternating current input is applied to a pair of control windings 79 and 79' on the saturable reactors 43 and 43'. A negative current feedback is applied to the same reactors responsive to the armature current. These feedbacks are so adjusted that they substantially neutralize each other at standstill and low speed. But the average value of the armature current is two to three times as high as the average value of the alternating input current at standstill and approach the same value at full speed. Therefore, when the speed increases the positive feedback becomes predominant and thus the desired variation in the resultant feedback is attained.

FIG. 4 also illustrates another modification which is desirable when the operation involves extensive braking. Resistances 82 and 82' are introduced in rectifier bridge arms 5 and 4 respectively. These resistances are in series relation with each other and with the armature relatively to the circuit in which the armature current flows during braking operation. If thus, for instance, those resistances have the same resistance value each as the armature, only one-third of the braking energy is dissipated in the armature.

A still further modification of the embodiment of FIG. 1 is shown in FIG. 4. A reactor of relatively high impedance 83 is connected between the upper alternating current input terminal 14 and the junction point 13 between the lower arms 4 and 5 of the rectifier network. The reactor 83 thus bypasses the rectification network for the armature but the alternating current flowing through the reactor passes through the rectification network for the field circuit. The object is to provide an initial field excitation to stabilize the speed at no load and to provide an initial braking torque which takes effect immediately when the control signal reverses phase.

While I have shown and described several particular embodiments of my invention, it is my intention to cover in the appended claims all changes and modifications of the examples here chosen for the purpose of disclosure, which do not constitute departures from the spirit and scope of the invention.

What is claimed is:

1. A motor control system comprising a reversible direct current motor having armature and field windings, an alternating current input circuit, rectifier means comprising a plurality of triodes each having a control electrode circuit and interconnecting said motor windings and said input circuit for energizing said armature winding with unidirectional current in only one direction, means connected to said field winding for selectively reversing the energization thereof, relay means for controlling said last mentioned means, an electric network circuit for providing an alternating control signal and terminals therefor, means interconnected with the control electrode circuit of each triode and the control signal terminals for controlling the timing of firing of said triodes in response to the amplitude of said control signal regardless of its phase, and means connected to be concurrently responsive to said control signal for controlling said relay means in response to the phase of said signal regardless of its amplitude.

2. A motor control system comprising a reversible direct current motor having armature and field windings, an alternating current input circuit, rectifier means comprising a plurality of triodes each having a control electrode circuit and interconnecting said motor windings and said input circuit for energizing said armature winding with uni-directional current in only one direction, means connected to said field winding for selectively reversing the energization thereof, relay means for controlling said last mentioned means, an electrode network circuit for providing an alternating control signal and terminals therefor, means interconnected with the control electrode circuit of each triode and the control signal terminals for controlling the timing of firing of said triodes in response to the amplitude of said control signal regardless of its phase, means connected to be concurrently responsive to said control signal for controlling said relay means in response to the phase of said signal regardless of its amplitude, and means for changing said electric network signal to effect gradual transition of said motor from motoring torque to braking torque at any motor speed.

3. A motor control system comprising a reversible direct current motor having armature and field windings, an alternating current input circuit, rectifier means comprising a plurality of triodes each having a control electrode circuit and interconnecting said motor windings and said input circuit for energizing said armature winding with uni-directional current in only one direction, second rectifier means connected to said field winding for selectively determining the direction of energization thereof from said input circuit, a first reversing relay connected to said second rectifier means for controlling the operation thereof, a plurality of magnetic amplifier means arranged one with each of the control circuits of the respective triodes and each such amplifier means comprising a saturable reactor and a series connected diode and respectively connected to said input circuit, an impedance element in circuit with each said saturable reactor for generating a peak of voltage thereacross upon saturation of its associated reactor, means interconnecting the impedance element of each magnetic amplifier with the control electrode of its associated triode, means for establishing a control quantity in each of said reactors to control the moment of saturation thereof comprising a plurality of reversely connected windings in series relation with signal input terminals and inductively arranged with said saturable reactors, an electric network circuit interconnecting said input circuit and said signal input terminals for producing an alternating current signal, a third rectifier means in said network circuit for diverting the half waves of one polarity of said A.C. signal to said field relay means and the half waves of opposite polarity to said plurality of reversely connected windings for controlling the time of firing of said triodes in response to the amplitude of such signal, the firing control of the triodes being adjusted so that zero or substantially zero signal in amplitude retards the firing of the triodes to such a degree as to render the armature current substantially zero whereas an increase in signal amplitude advances firing and increases armature current in proportion to such increase, means connected to said field reversing relay for effecting reversal of said field winding polarity in response to a predetermined signal value below a value necessary to provide a minimum operational torque of said motor, said last mentioned means being arranged to produce one polarity of field energization when the polarity of the half wave of the signal coincides with a like polarity half wave of the power supply and the opposite polarity field energization when the polarity of the half wave of the signal coincides with the opposite polarity half wave of the power supply, and means for blocking response of said field reversing means to any variation in signal strength above said predetermined signal value.

4. A motor control system comprising a reversible direct current motor having armature and field windings, an alternating current input circuit, rectifier means comprising a plurality of triodes each having a control electrode circuit and interconnecting said motor windings and said input circuit for energizing said armature winding with uni-directional current in only one direction, a plurality of magnetic amplifier means connected to the control electrode circuit of each of the respective triodes for firing said triodes, means including a plurality of windings inductively associated with said magnetic amplifiers for timing the firing of said triodes, an electric network for producing an alternating current signal comprising a first resistance element provided with outer terminals and first and second intermediate taps and connected for energization from said input circuit, a second resistance element having outer terminals connected across the outer terminals of said first resistance and provided with adjustable means operable to establish contact at any given point between the outer terminals thereof, a connection terminal for said adjustable means, signal input terminals being formed between the intermediate tap of said first resistance element and said connection terminal of said adjustable means, a first diode, a rate-of-change resistance element; circuit means connecting said diode, said rate-of-change resistance element and the said plurality of windings of said magnetic amplifiers in series relation across said signal input terminals for controlling the timing of firing of said triodes in response to the amplitude of said control signal regardless of its phase, a first rate-of-change capacitor connected in parallel relation with said plurality of windings, a second rate-of-change capacitor connected in parallel relation with said first rate-of-change resistance element, a second rate-of-change resistance element connected in parallel relation with said rate-of-change capacitors, a field control circuit interconnecting said first intermediate tap of said first resistance element and the adjustable means of said second resistance element and including in series relation therewith a field control winding and a second diode in circuit to the connection terminal of said adjustable means, a corrective compensation resistance element connected in parallel with said second diode a bias-current resistance element interconnecting said field control winding and an outer terminal of said first resistance element; means connected to said field winding for determining the direction of current therein comprising a pair of reversely poled diodes connected in bypass circuits to said field winding and arranged respectively to conduct currents of opposite polarity, field relay means for effecting closing of a bypass circuit through one or the other of said bypass diodes, a control magnetic amplifier comprising a saturable reactor having its point of saturation controlled by said field control winding for controlling the operation of said field relay means in response to the phase of said signal regardless of its amplitude.

5. A motor control system comprising a direct current motor, means for separately controlling the current flow in the armature and field winding of said motor, a rectification system comprising a plurality of semconductor triodes adapted to deliver current to said motor armature, means for controlling the timing of firing said triodes in response to the amplitude of an alternating current control signal regardless of the phase of said signal, rectifier means for energizing said field winding with a reversible polarity in response to the reversible phase of said signal, means for adjusting the circuit which controls the timing of firing said triodes so that the control is set for full retard of firing in response to a signal amplitude sufficient to activate the control for reversing the polarity of the field and a unidirectionally conducting circuit so poled as to oppose the voltage generated by the motor armature during motoring operation connected between the terminals of said motor armature.

6. The motor control system of claim 5 further comprising means for applying to the control means for timing the firing said triodes a positive feedback responsive to the alternating input current and a negative feedback responsive to the current in the motor armature.

7. The motor control system of claim 5 further comprising a resistance connected in series relation to said unidirectionally conducting circuit between the terminals of the motor armature.

8. The motor control system of claim 5 further comprising a reactor connected to be energized from the alternating current power supply and in series relation to the rectification network for the field circuit while bypassing the rectification network for the armature circuit.

No references cited.